(12) United States Patent
Kato

(10) Patent No.: US 9,185,672 B2
(45) Date of Patent: Nov. 10, 2015

(54) SATELLITE RADIO-CONTROLLED WRISTWATCH

(71) Applicants: CITIZEN HOLDINGS CO., LTD., Tokyo (JP); CITIZEN WATCH CO., LTD., Tokyo (JP)

(72) Inventor: Akira Kato, Sayama (JP)

(73) Assignees: CITIZEN HOLDINGS CO., LTD., Tokyo (JP); CITIZEN WATCH CO., LTD., Tokyo (JP)

(*) Notice: Subject to any disclaimer, the term of this patent is extended or adjusted under 35 U.S.C. 154(b) by 0 days.

(21) Appl. No.: 14/413,709

(22) PCT Filed: Jul. 10, 2013

(86) PCT No.: PCT/JP2013/068908
§ 371 (c)(1),
(2) Date: Jan. 9, 2015

(87) PCT Pub. No.: WO2014/010645
PCT Pub. Date: Jan. 16, 2014

(65) Prior Publication Data
US 2015/0139374 A1 May 21, 2015

(30) Foreign Application Priority Data

Jul. 11, 2012 (JP) ................................. 2012-155973

(51) Int. Cl.
*H04W 56/00* (2009.01)
*G04R 20/04* (2013.01)
*G04R 20/02* (2013.01)
*G04G 5/00* (2013.01)
(Continued)

(52) U.S. Cl.
CPC .............. *H04W 56/0015* (2013.01); *G04G 5/00* (2013.01); *G04R 20/02* (2013.01); *G04R 20/04* (2013.01);
(Continued)

(58) Field of Classification Search
CPC ...... G04B 47/061; G04B 47/065; H01Q 3/242
See application file for complete search history.

(56) References Cited

U.S. PATENT DOCUMENTS

2008/0025151 A1* 1/2008 Urano et al. .................... 368/14
2008/0175105 A1 7/2008 Urano et al.
2009/0015470 A1 1/2009 Fujisawa

FOREIGN PATENT DOCUMENTS

JP 2011-043449 A 3/2011

OTHER PUBLICATIONS

Office Action for relating U.S. Appl. No. 14/413,703 dated Jul. 8, 2015.

*Primary Examiner* — Leon-Viet Nguyen
(74) *Attorney, Agent, or Firm* — Hubbs, Enatsky & Inoue PLLC

(57) ABSTRACT

Power consumption when reception is carried out in response to a reception instruction by a user is reduced in a satellite radio-controlled wristwatch. A satellite radio-controlled wristwatch according to the present invention includes: a satellite radio wave reception unit including an antenna, a high frequency circuit, and a decoder circuit; a clock circuit; an operating member; and a controller for controlling timings of at least: an activation operation; an acquisition and tracking operation; and a time information acquisition operation, the controller being configured to: detect a reception instruction by a user; immediately start the activation operation when a delay time period from when the reception instruction is issued to an earliest time information receivable time point is longer than a first threshold value and shorter than a second threshold value; wait for arrival of an activation time point inversely calculated from the earliest time information receivable time point to start the activation operation when the delay time period is longer than the second threshold value; and wait for arrival of an activation time point inversely calculated from a next earliest time information receivable time point to start the activation operation when the delay time period is shorter than the first threshold value.

11 Claims, 12 Drawing Sheets

(51) Int. Cl.
*H04L 7/00* (2006.01)
*H01Q 3/24* (2006.01)
*G04B 47/06* (2006.01)

(52) U.S. Cl.
CPC ............ *H04L 7/0008* (2013.01); *G04B 47/061* (2013.01); *G04B 47/065* (2013.01); *H01Q 3/242* (2013.01)

FIG.4

SUBFRAME 1

| WORD | BIT POSITION | BIT COUNT | | CONTENT |
|---|---|---|---|---|
| 1 | 1 | 22 | TLM | TELEMETRY WORD |
| 2 | 31 | 22 | HOW | HANDOVER WORD |
| 3 | 61 | 10 | WN | WEEK NUMBER |
|   | 73 | 4 | URA | RANGE ACCURACY |
|   | 77 | 6 | SVhealth | SATELLITE HEALTH STATE |
|   | 83 | 2 MSB | IODC | CLOCK INFORMATION NUMBER |
| 7 | 197 | 8 | TGD | GROUP DELAY |
| 8 | 211 | 8 LSB | IODC | CLOCK INFORMATION NUMBER |
|   | 219 | 16 | toc | EPOCH TIME (CLOCK) |
| 9 | 241 | 8 | af2 | CLOCK CORRECTION COEFFICIENT |
|   | 249 | 16 | af1 | CLOCK CORRECTION COEFFICIENT |
| 10 | 271 | 22 | af0 | CLOCK CORRECTION COEFFICIENT |

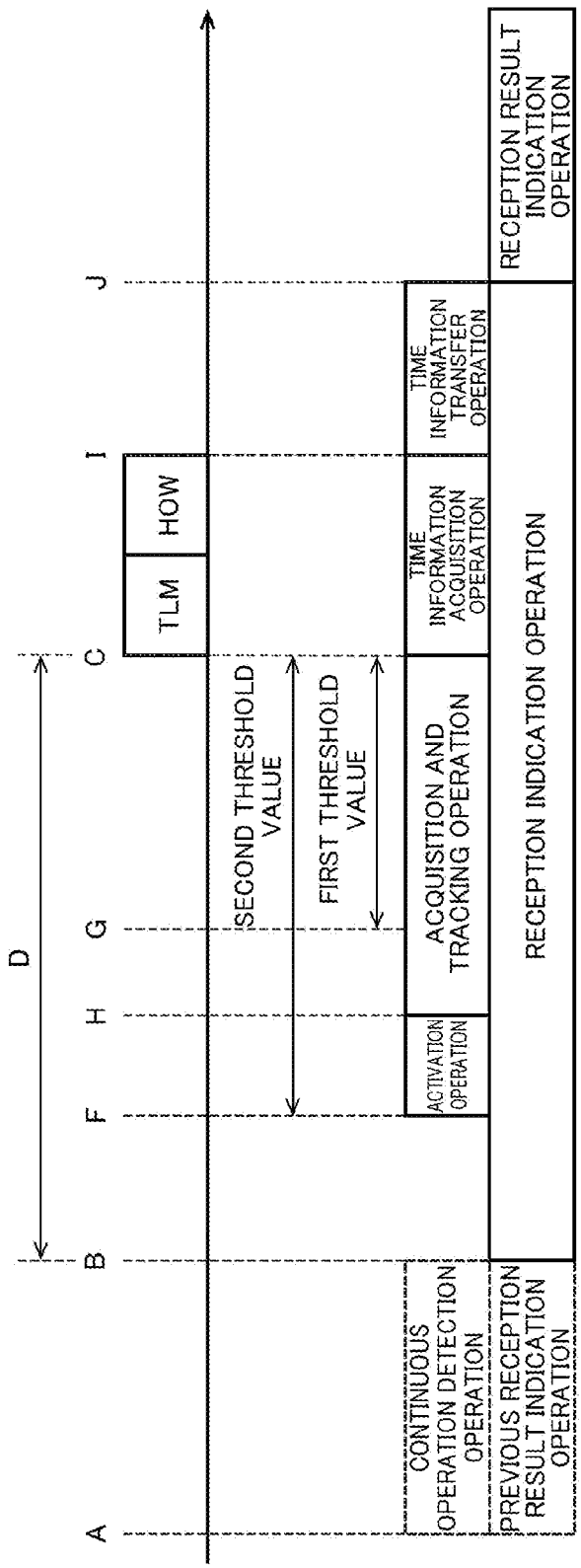

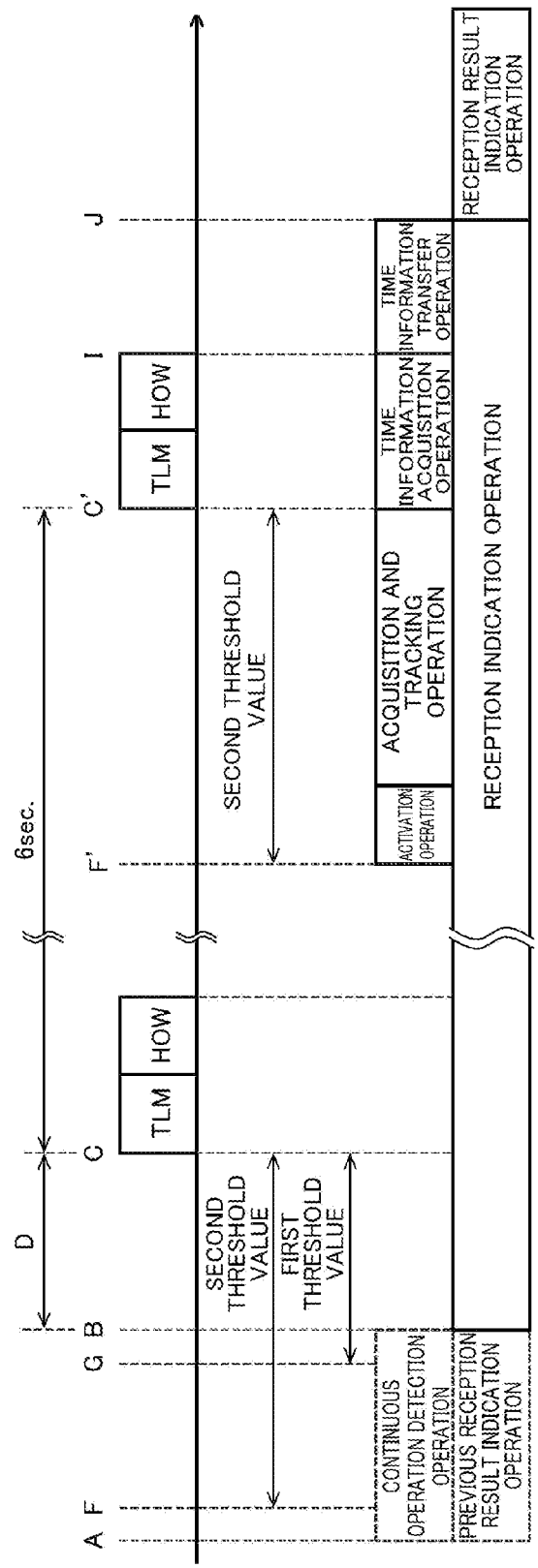

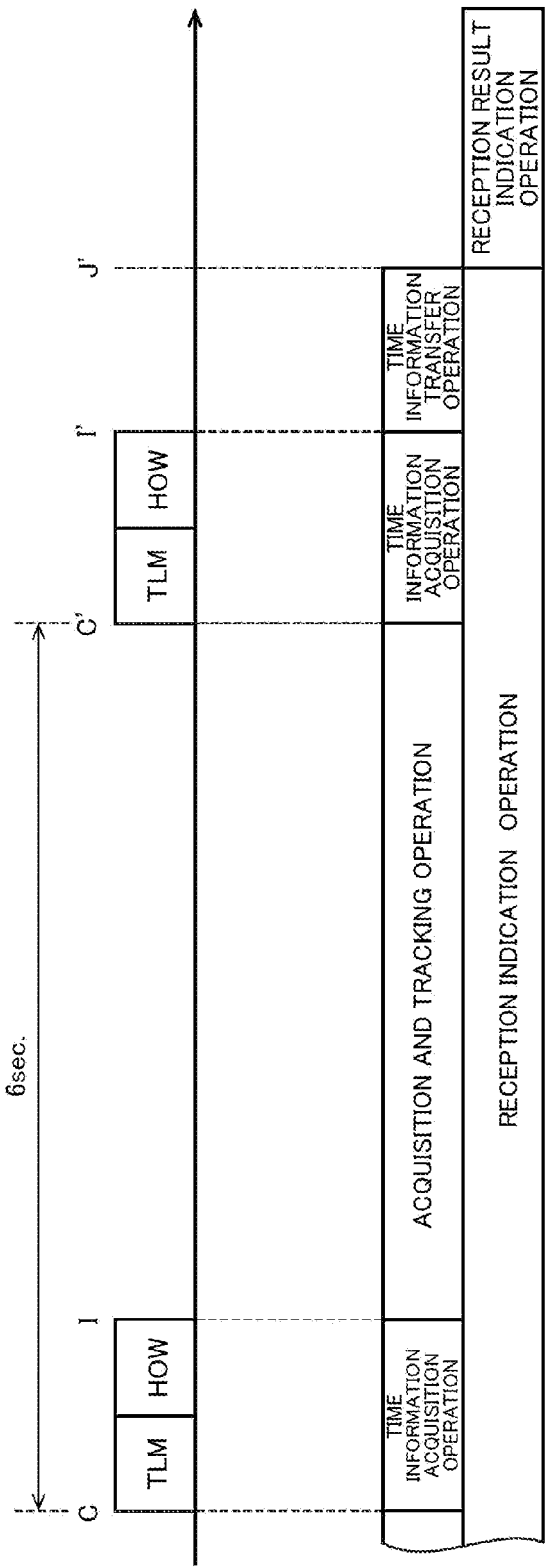

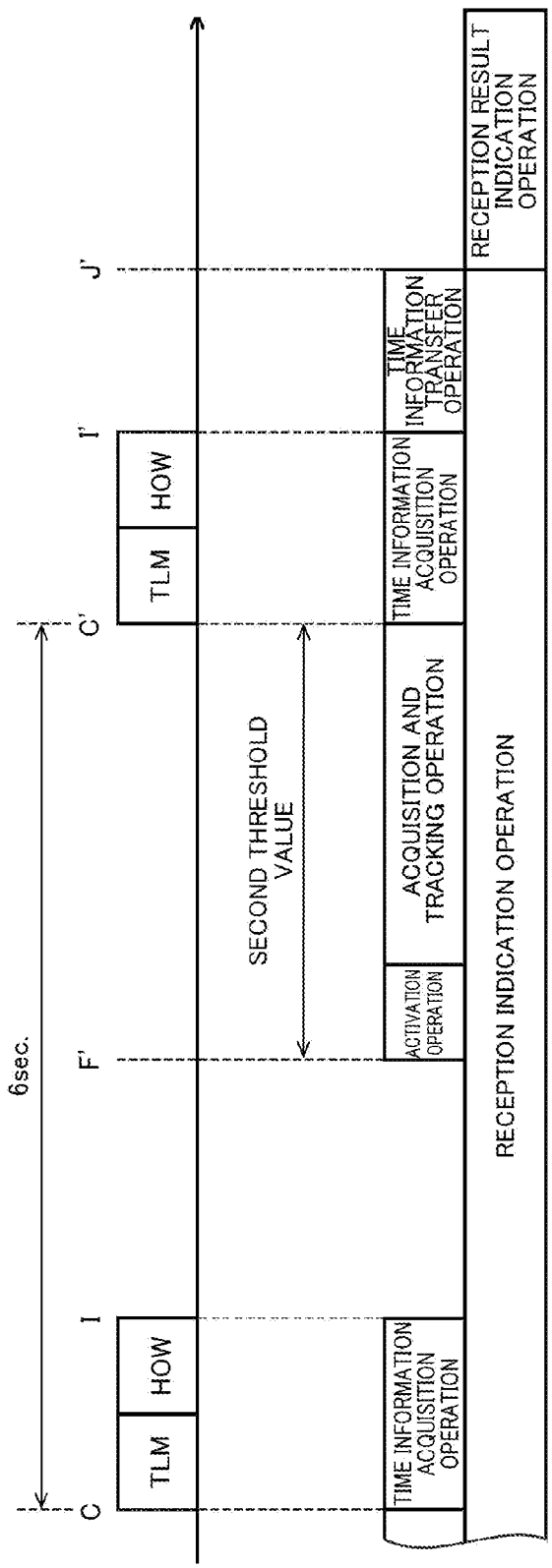

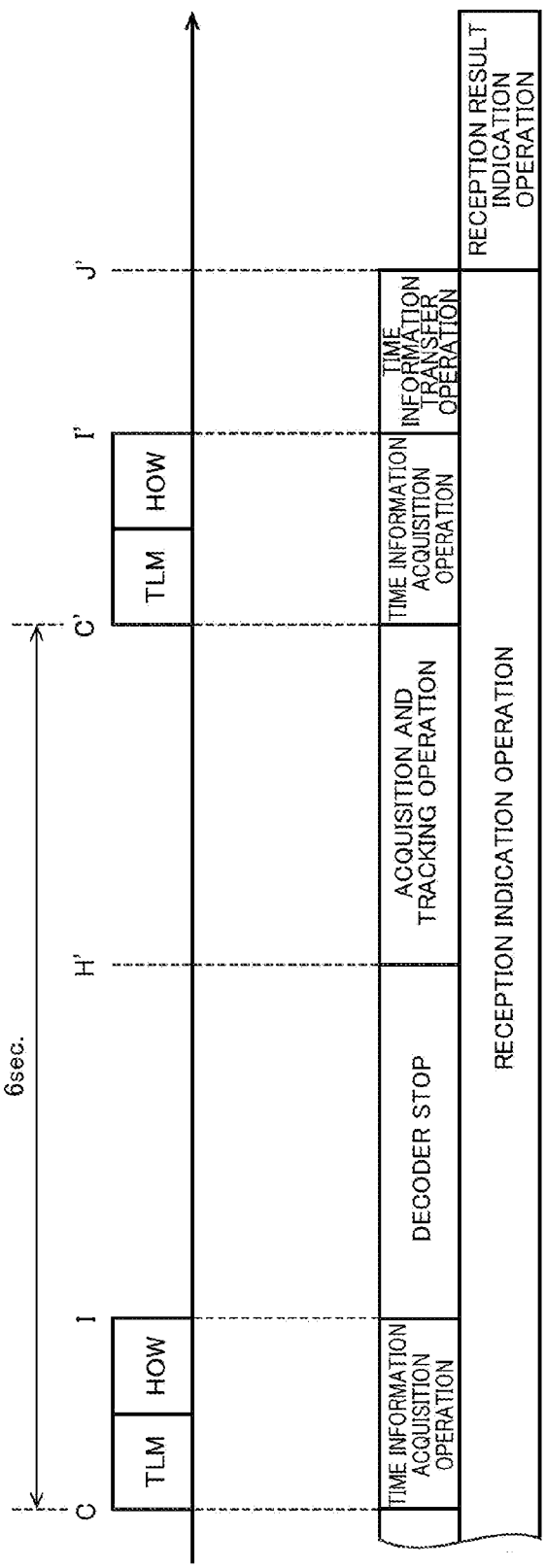

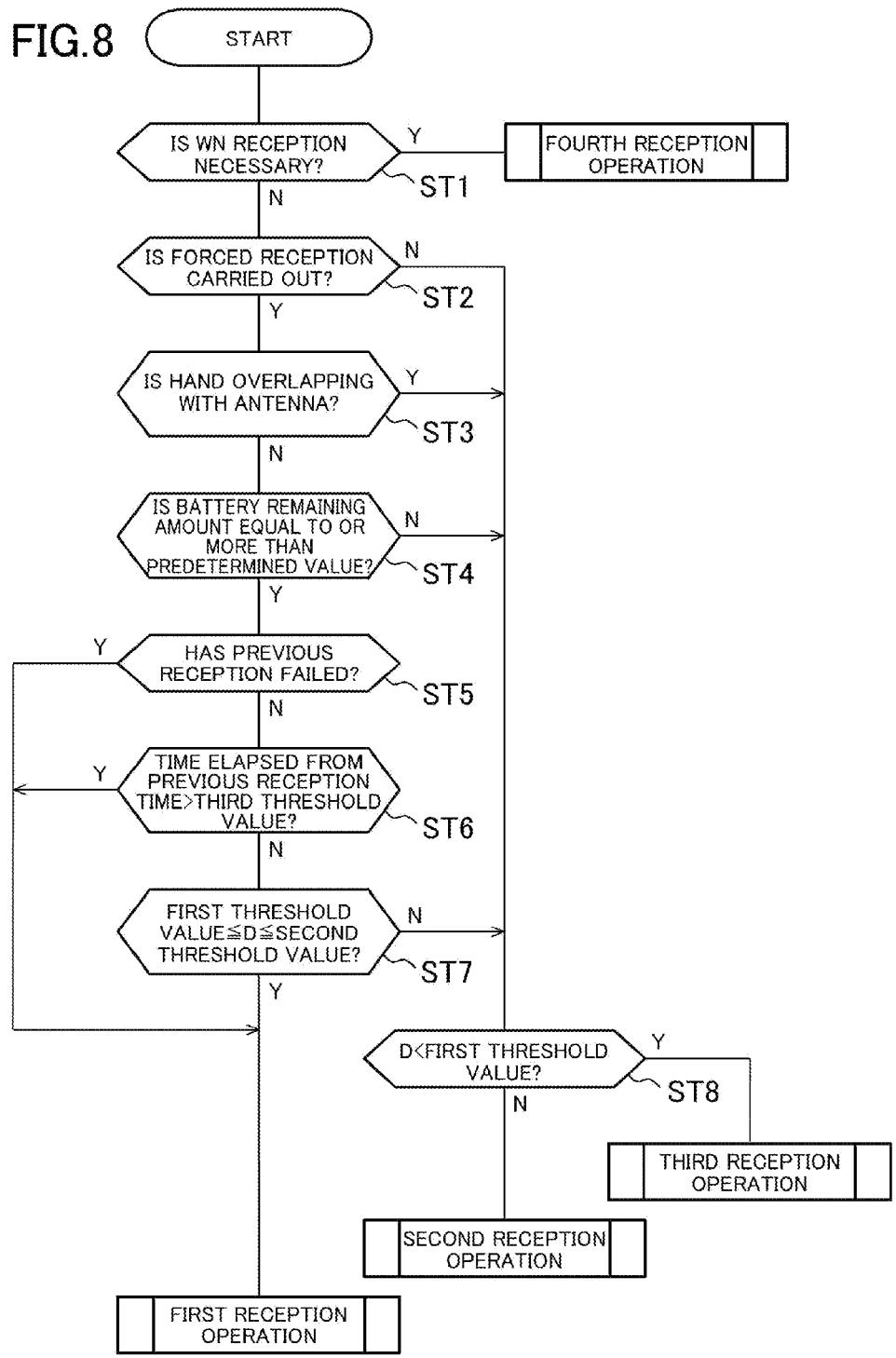

SATELLITE RADIO-CONTROLLED WRISTWATCH

CROSS REFERENCE TO RELATED APPLICATIONS

This application is a National Stage of International Application No. PCT/JP2013/068908 filed Jul. 10, 2013, claiming priority based on Japanese Patent Application No. 2012-155973 filed on Jul. 11, 2012. The contents of each of the above documents are incorporated herein by reference in their entirety.

TECHNICAL FIELD

The present invention relates to a satellite radio-controlled wristwatch.

BACKGROUND ART

There has been proposed a radio-controlled wristwatch (hereinafter referred to as "satellite radio-controlled wristwatch") configured to receive a radio wave (hereinafter referred to as "satellite radio wave") from an artificial satellite used for a positioning system, such as a Global Positioning System (GPS) satellite, to thereby adjust time. Such adjustment is possible because positioning signals typified by a GPS signal contain accurate time information. An ultra-high frequency wave is used for such a satellite radio wave, and hence a larger amount of information is sent per hour as compared to a low frequency wave used for a standard radio wave, which has been used in the related art for time adjustment on the ground. As a result, the time required for reception of the time information is considered to be reduced as compared to the case where the standard radio wave is received.

In Patent Literature 1, there is disclosed a GPS-equipped wristwatch corresponding to the satellite radio-controlled wristwatch.

CITATION LIST

Patent Literature

[Patent Literature 1] JP 2011-43449 A

SUMMARY OF INVENTION

Technical Problem

In the satellite radio wave, the time information is not always transmitted, but is transmitted at a certain interval determined depending on the specification of the positioning system. For example, in the case of the GPS, the time information is called time of week (TOW), and is contained in a data string called handover word (HOW) that is transmitted every 6 seconds. That is, the timing at which the time information is receivable arrives every 6 seconds. In contrast, the timing at which a user instructs the reception by, for example, operating a button is irrespective of the above-mentioned timing. Therefore, a time period from the reception instruction by the user to the timing at which the time information is receivable changes depending on the reception instruction timing.

By the way, in order to receive the satellite radio wave that is an ultra-high frequency wave, operation of a high frequency circuit is necessary, but this circuit requires an extremely high operating frequency, which causes large power consumption. Therefore, in order to increase the operation duration of the satellite radio-controlled wristwatch, it is necessary to reduce the operating time of the high frequency circuit as short as possible. In this case, when the time period from the reception instruction by the user to the timing at which the time information is receivable is long, the high frequency circuit is operated more than necessary, which increases the power consumption. Conversely, when this time period is too short (for example, when the timing at which the time information is receivable arrives immediately after the reception is instructed by the user), the acquisition of the satellite radio wave is insufficient, which causes reception failure to require reception again, eventually resulting in the increase in power consumption.

The present invention has been made in view of the above-mentioned circumstances, and has an object to reduce power consumption when reception is carried out in response to the reception instruction by the user in the satellite radio-controlled wristwatch.

Solution to Problem

The invention disclosed in this application to achieve the above-mentioned object has various aspects, and the representative aspects are outlined as follows.

(1) A satellite radio-controlled wristwatch, including: a satellite radio wave reception unit including an antenna for receiving a satellite radio wave, a high frequency circuit, and a decoder circuit; a clock circuit for holding and counting an internal time; an operating member for receiving an operation by a user; and a controller for controlling timings of at least: an activation operation of supplying power to the satellite radio wave reception unit for activation thereof; an acquisition and tracking operation of acquiring and tracking a certain satellite radio wave by the satellite radio wave reception unit; and a time information acquisition operation of acquiring time information from the satellite radio wave received by the satellite radio wave reception unit, the controller being configured to: detect a reception instruction by the user through the operation of the operating member; immediately start the activation operation when a delay time period from a time point at which the reception instruction is issued to an earliest time information receivable time point predicted based on the internal time is longer than a first threshold value and shorter than a second threshold value; wait for arrival of an activation time point inversely calculated from the earliest time information receivable time point to start the activation operation when the delay time period is longer than the second threshold value; and wait for arrival of an activation time point inversely calculated from a next earliest time information receivable time point to start the activation operation when the delay time period is shorter than the first threshold value.

(2) The satellite radio-controlled wristwatch according to Item (1), in which the controller starts the acquisition and tracking operation immediately after the activation operation ends, and waits for arrival of the earliest time information receivable time point to start the time information acquisition operation.

(3) The satellite radio-controlled wristwatch according to Item (1) or (2), further including an indication member for indicating at least that a first reception operation is in progress and a second reception operation is in progress, in which the controller is configured to: cause the indication member to indicate that the first reception operation is in progress when the delay time period is longer than the first threshold value and shorter than the second threshold value; and cause the indication member to indicate that the second reception operation is in progress when the delay time period is longer than the second threshold value or shorter than the first threshold value.

(4) The satellite radio-controlled wristwatch according to any one of Items (1) to (3), in which the controller starts the activation operation immediately after the reception instruction is issued when a previous acquisition of the time information has failed.

(5) The satellite radio-controlled wristwatch according to any one of Items (1) to (4), in which the controller starts the activation operation immediately after the reception instruction is issued when a time period elapsed from a time point of a previous acquisition of the time information is longer than a third threshold value.

(6) The satellite radio-controlled wristwatch according to any one of Items (1) to (5), in which the operating member is a pushbutton, and in which the controller determines that the reception instruction is issued when a time period of pressing the operating member reaches a first duration time period, and cancels the reception instruction to immediately end an operation of the satellite radio wave reception unit when the pressing of the operating member is interrupted before the time period of pressing the operating member reaches a second duration time period.

Advantageous Effects of Invention

According to the aspect of Item (1) or (2), power consumption when reception is carried out in response to the reception instruction by the user may be reduced in the satellite radio-controlled wristwatch.

Further, according to the aspect of Item (3), the user may be notified of whether the satellite radio-controlled wristwatch carries out an operation placing priority on short-time reception or an operation placing priority on reception success probability.

Further, according to the aspect of Item (4) or (5), the possibility of succeeding reception of the satellite radio wave may be increased.

Moreover, according to the aspect of Item (6), the entire time required for the reception of the satellite radio wave may be reduced.

BRIEF DESCRIPTION OF DRAWINGS

FIG. 4 is a table showing the structure of subframe 1.

FIG. 5B is a time chart illustrating a second reception operation.

FIG. 6A is a time chart illustrating a third reception operation.

FIG. 7A is a time chart illustrating a first re-reception operation.

FIG. 7B is a time chart illustrating a second re-reception operation.

FIG. 7C is a time chart illustrating a third re-reception operation.

FIG. 8 is a flow chart illustrating an operation relating to reception of the satellite radio-controlled wristwatch according to the embodiment of the present invention.

DESCRIPTION OF EMBODIMENTS

Figure 1:
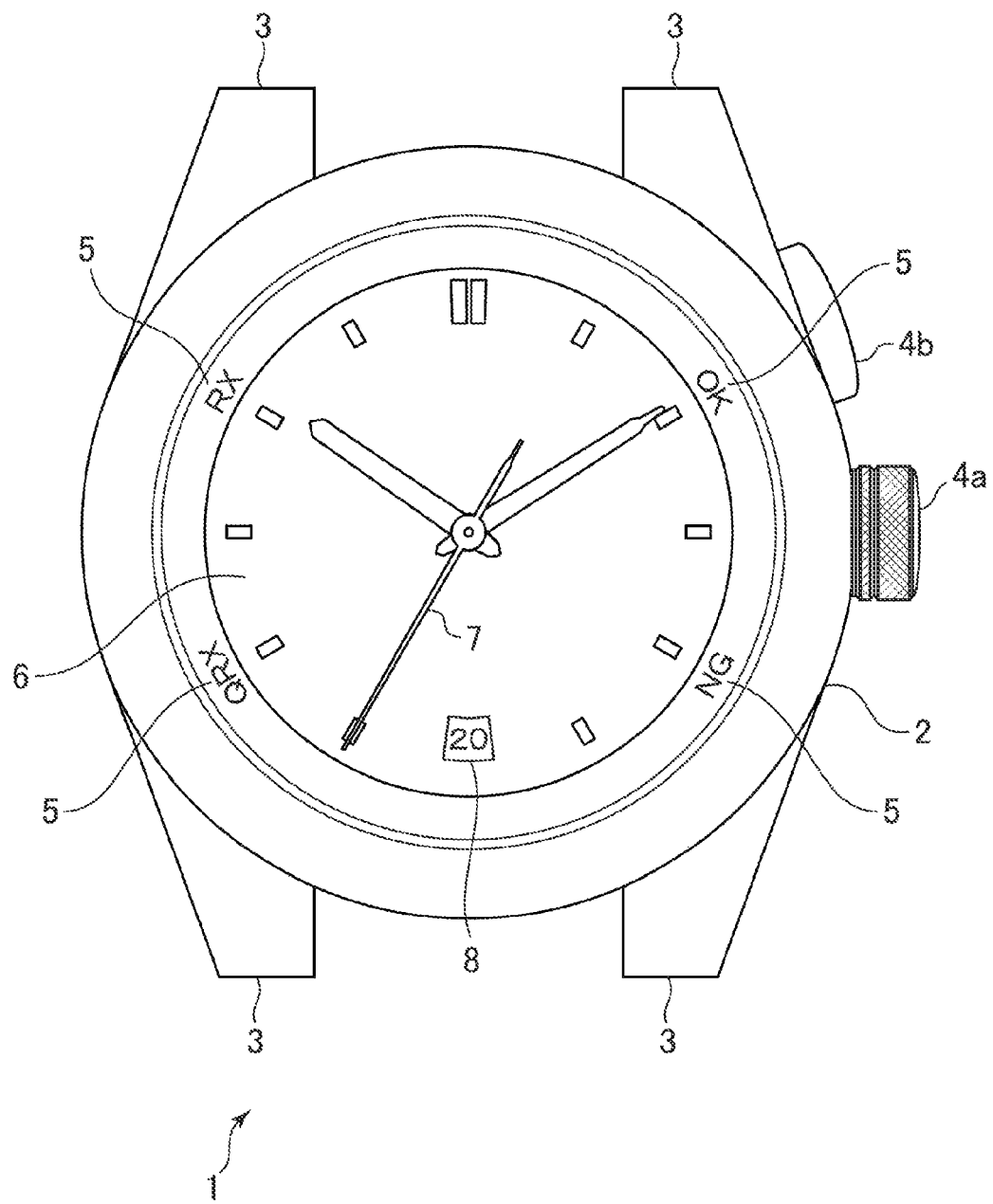
FIG. 1 is a plan view illustrating a satellite radio-controlled wristwatch according to an embodiment of the present invention.

FIG. 1 is a plan view illustrating a satellite radio-controlled wristwatch 1 according to an embodiment of the present invention. As described above, the satellite radio-controlled wristwatch as used herein refers to one type of radio-controlled wristwatches that are wristwatches having a function of receiving an external radio wave to adjust the time held inside the watch to an accurate time, which is configured to receive a satellite radio wave to adjust the time. Note that, the satellite radio-controlled wristwatch 1 according to this embodiment receives a radio wave (L1 wave) from a GPS satellite as the satellite radio wave.

In FIG. 1, reference numeral 2 denotes an exterior case, and band attachment portions 3 are provided to be opposed in the 12 o'clock direction and the 6 o'clock direction. Further, a crown 4a and a push button 4b serving as operating members are provided on a side surface of the satellite radio-controlled wristwatch 1 on the 3 o'clock side. Note that, in FIG. 1, the 12 o'clock direction of the satellite radio-controlled wristwatch 1 is an upward direction of FIG. 1, and the 6 o'clock direction is a downward direction of FIG. 1.

The satellite radio-controlled wristwatch 1 uses a hand mechanism as illustrated in FIG. 1, in which an hour hand, a minute hand, and a second hand are coaxially provided, with the central position of the satellite radio-controlled wristwatch 1 as the rotation center. Note that, although the second hand in this embodiment is coaxial with the hour and minute hands, the second hand may be replaced with a so-called chronograph hand and the second hand may be arranged at an arbitrary position as a secondary hand as exemplified by a chronograph watch. Then, position indications 5 of symbols "OK", "NG", "QRX", and "RX" are marked or printed on the exterior case 2 at appropriate positions outside a watch face 6. Those characters notify the user of various reception states of the satellite radio-controlled wristwatch 1 by causing the second hand to rotate and move to point to any one of those position indications 5 during or around the reception of the satellite radio wave by the satellite radio-controlled wristwatch 1. Therefore, the secondhand is also a reception indication member 7 for indicating, to the user, various reception states of the satellite radio-controlled wristwatch 1. Note that, the respective position indications 5 herein have the following meanings. That is, symbols "QRX" and "RX" mean that reception is in progress, symbol "OK" means that the reception has succeeded, and symbol "NG" means that the reception has failed. Note that, in this embodiment, there are two kinds of indications, "QRX" and "RX", for indicating that the reception is in progress because the satellite radio-controlled wristwatch 1 carries out some kinds of reception operations. Among them, in particular, symbol "QRX" represents that a reception operation of ending the reception operation in a short period of time is in progress, while symbol RX represents that another reception operation is in progress. When the reception indication member 7 is indicating symbol "QRX", the user can know that the satellite radio-controlled wristwatch 1 is carrying out an operation placing priority on short-time reception. Further, when the reception indication member 7 is indicating symbol "RX", the user can know that the satellite radio-controlled wristwatch 1 is carrying out an operation placing priority on reception success probability.

Various reception operations to be executed by the satellite radio-controlled wristwatch 1 are described later.

Further, a date window 8 is provided at the 6 o'clock position of the watch face 6, and date can be visually recognized based on a position of a day dial shown through the date window 8. Note that, the date window 8 is merely an example and date display by an appropriate mechanism may be provided at an appropriate position. For example, in addition to the date display using the day dial or another rotating disk, day-of-week display and various kinds of indication using a secondary hand may be used. Alternatively, display by an electronic display device such as a liquid crystal display device may be used. In any case, the satellite radio-controlled wristwatch 1 internally holds at least information on the current date as well as the current time.

The satellite radio-controlled wristwatch 1 according to this embodiment further includes a patch antenna serving as a high frequency receiving antenna on the rear side of the watch face 6 at a position on the 9 o'clock side. Note that, the form of the antenna may be determined in accordance with the radio wave to be received, and an antenna of another form such as an inverted-F antenna may be used.

Figure 2:
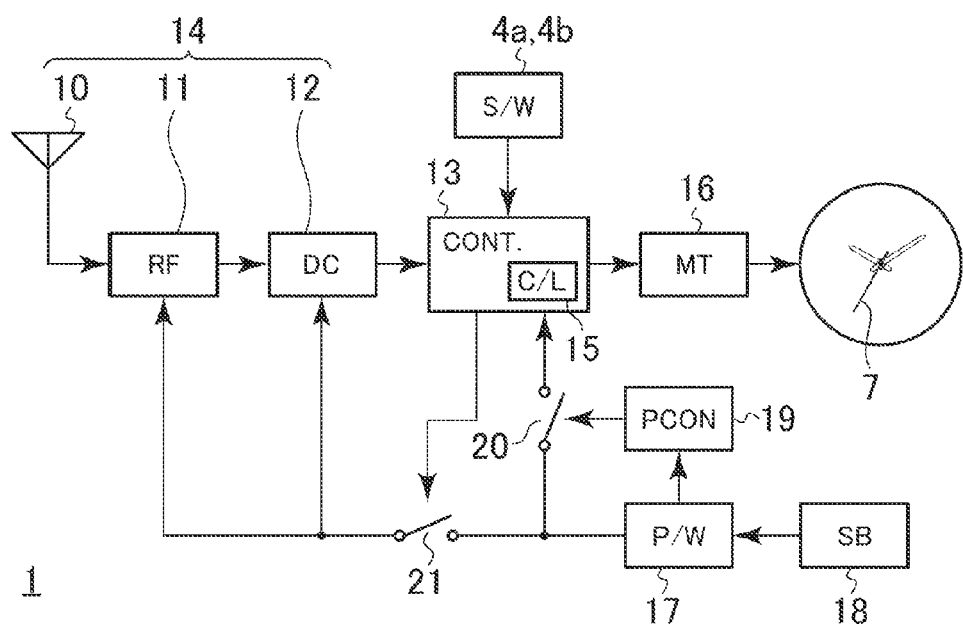
FIG. 2 is a functional block diagram of the satellite radio-controlled wristwatch according to the embodiment of the present invention.

FIG. 2 is a functional block diagram of the satellite radio-controlled wristwatch 1 according to this embodiment. A satellite radio wave is received by an antenna 10 and converted into a base band signal by a high frequency circuit 11. After that, various kinds of information contained in the satellite radio wave is extracted by a decoder circuit 12. The extracted information is transferred to a controller 13. In this case, the antenna 10, the high frequency circuit 11, and the decoder circuit 12 construct a satellite radio wave reception unit 14 for receiving a satellite radio wave and extracting information. The satellite radio wave reception unit 14 receives the satellite radio wave that is an ultra-high frequency wave and extracts the information, and hence operates at a high frequency.

The controller 13 is a microcomputer for controlling the entire operation of the satellite radio-controlled wristwatch 1, and includes a clock circuit 15 therein, thereby having a function of counting the internal time, which is the time held by the clock circuit 15. The accuracy of the clock circuit 15 is about ±15 seconds per month although varying depending on the accuracy of a crystal oscillator to be used or the use environment such as temperature. It should be understood that the accuracy of the clock circuit 15 can be set arbitrarily as necessary. Further, the controller 13 appropriately adjusts the internal time held by the clock circuit 15 as necessary, to thereby keep the internal time accurate. The controller 13 is only required to have a response speed necessary for responding to counting and a user's operation. Therefore, the controller 13 operates at a lower frequency than that of the above-mentioned satellite radio wave reception unit 14, and hence its power consumption is small.

The controller 13 inputs a signal from the operating member (crown 4a, push button 4b, or the like) so that the operation by the user can be detected. Further, the controller 13 outputs a signal for driving a motor 16 based on the internal time, to thereby drive the hands to indicate the time. Further, necessary indication is given to the user by the reception indication member 7. Note that, in this embodiment, the reception indication member 7 is the second hand, but the present invention is not limited thereto. Another hand or another member such as a disk may be used. For example, a dedicated hand for indication of various functions may be used as the reception indication member. Alternatively, the respective hands may be independently driven so as to drive a plurality of hands, for example, the hour hand and the minute hand in an overlapped manner, thereby using the hands as the reception indication member. Still alternatively, the motion speed and the motion mode (intermittent drive, movement of the second hand at two-second intervals, or the like) of a hand may differ from those in normal hand motion, to thereby use the hand as the reception indication member. Further, an electronic display member such as a liquid crystal display device may be used as the reception indication member.

The satellite radio-controlled wristwatch 1 further includes, as its power supply, a battery 17 that is a secondary battery such as a lithium-ion battery. The battery 17 accumulates electric power obtained by power generation of a solar battery 18 arranged on or under the watch face 6 (see FIG. 1). Then, the battery 17 supplies electric power to the high frequency circuit 11, the decoder circuit 12, and the controller 13.

A power supply circuit 19 monitors an output voltage of the battery 17. When the output voltage of the battery 17 decreases to be lower than a predetermined threshold, the power supply circuit 19 turns off a switch 20 to stop the supply of power to the controller 13. In response thereto, the supply of power to the clock circuit 15 is also stopped. Thus, when the switch 20 is turned off, the internal time held by the clock circuit 15 is lost. Further, when the output voltage of the battery 17 is recovered due to the power generation of the solar battery 18 or the like, the power supply circuit 19 turns on the switch 20 to supply power to the controller 13, to thereby recover the functions of the satellite radio-controlled wristwatch 1. Further, a switch 21 is a switch for turning on or off the supply of power to the high frequency circuit 11 and the decoder circuit 12, and is controlled by the controller 13. The high frequency circuit 11 and the decoder circuit 12, which operate at a high frequency, are large in power consumption, and hence the controller 13 turns on the switch 21 to operate the high frequency circuit 11 and the decoder circuit 12 only when the radio wave is received from the satellite, and otherwise turns off the switch 21 to reduce power consumption.

The satellite radio wave may be received when a request is issued from a user through operation of the operating member such as the crown 4a or the push button 4b (hereinafter referred to as "manual reception"), or when a predetermined time has come (hereinafter referred to as "regular reception"). Alternatively, the satellite radio wave may be received based on an elapsed time from the time at which the previous time adjustment was made, or based on information representing the generated energy of the solar battery 18 or other information representing an ambient environment of the satellite radio-controlled wristwatch 1 (hereinafter referred to as "environmental reception"). Note that, as a term opposed to "manual reception", the regular reception and the environmental reception are collectively referred to as "automatic reception".

Subsequently, a description is given of a signal from a GPS satellite received by the satellite radio-controlled wristwatch 1 according to this embodiment. The signal transmitted from the GPS satellite has a carrier frequency of 1,575.42 MHz called "$L_1$ band". The signal is encoded by a C/A code specific to each GPS satellite modulated by binary phase shift keying (BPSK) at a period of 1.023 MHz, and is multiplexed by a so-called code division multiple access (CDMA) method. The C/A code itself has a 1,023-bit length, and message data on the signal changes every 20 C/A codes. In other words, 1-bit information is transmitted as a signal of 20 ms.

Figure 3:
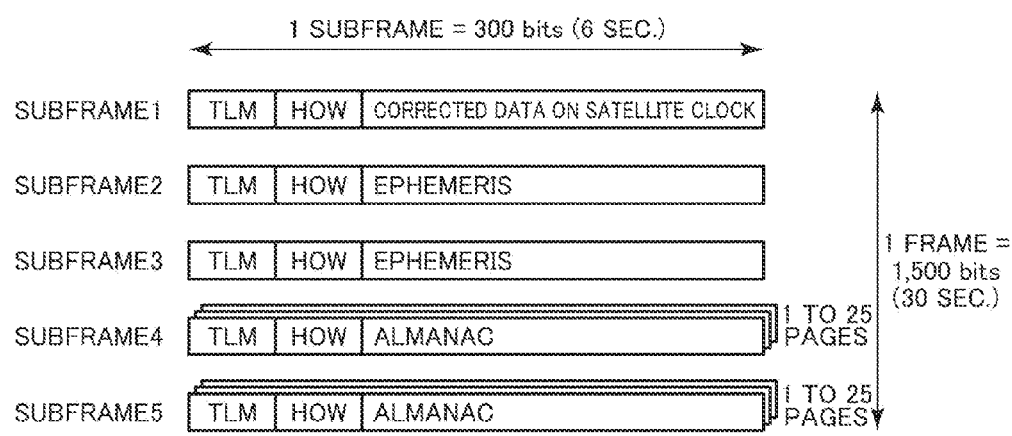
FIG. 3 is a schematic diagram illustrating the structure of subframes of a signal transmitted from a GPS satellite.

The signal transmitted from the GPS satellite is divided into frames having a unit of 1,500 bits, namely 30 seconds, and each frame is further divided into five subframes. FIG. 3 is a schematic diagram illustrating the structure of subframes of the signal transmitted from the GPS satellite. Each subframe is a signal of 6 seconds containing 300-bit information. The subframes are numbered 1 to 5 in order. The GPS satellite transmits the subframes sequentially starting from subframe 1. When finishing the transmission of subframe 5, the GPS satellite returns to the transmission of subframe 1 again, and repeats the same process thereafter.

At the head of each subframe, a telemetry word represented by TLM is transmitted. TLM contains a preamble that is a code indicating the head of each subframe, and information on a ground control station. Subsequently, a handover word represented by HOW is transmitted. HOW contains TOW as information relating to the current time, also called "Z count". TOW is a 6-second-unit time counted from 0:00 AM on Sunday at GPS time, and indicates a time at which the next subframe is started.

Information following HOW differs depending on the subframe, and subframe 1 includes corrected data of a satellite clock. FIG. 4 is a table showing the structure of subframe 1. Subframe 1 includes a week number represented by WN following HOW. WN is a numerical value indicating a current week counted by assuming Jan. 6, 1980 as a week 0. Accordingly, by receiving both WN and TOW, accurate day and time at the GPS time can be obtained. Note that, once the reception of WN is succeeded, an accurate value can be known through counting of the internal time unless the satellite radio-controlled wristwatch 1 loses the internal time for some reason, for example, running out of the battery. Therefore, re-reception is not always necessary. Note that, as described above, WN is 10-bit information and hence is returned to 0 again when 1,024 weeks has elapsed. Further, the signal from the GPS satellite contains other various kinds of information, but information not directly relating to the present invention is merely shown and its description is omitted.

Referring to FIG. 3 again, subframe 2 and subframe 3 contain orbit information on each satellite called "ephemeris" following HOW, but its description is herein omitted.

In addition, subframes 4 and 5 contain general orbit information for all the GPS satellites called "almanac" following HOW. The information contained in subframes 4 and 5, which has a large information volume, is transmitted after being divided into units called "pages". Then, the data to be transmitted in each of subframes 4 and 5 is divided into pages 1 to 25, and contents of the pages that differ depending on the frames are transmitted in order. Accordingly, 25 frames, that is, 12.5 minutes is required to transmit the contents of all the pages.

Note that, as is apparent from the above description, TOW is contained in all the subframes and can therefore be acquired at a timing that arrives every 6 seconds. On the other hand, WN is contained in subframe 1 and can therefore be acquired at a timing that arrives every 30 seconds.

Subsequently, individual operations executed when the satellite radio-controlled wristwatch 1 receives a satellite radio wave are described below with reference to FIGS. 1 and 2. The controller 13 executes a reception operation that is a series of operations of receiving the satellite radio wave by the satellite radio-controlled wristwatch 1 while controlling the timings of those individual operations.

(1) Continuous Operation Detection Operation

A continuous operation detection operation is an operation of detecting that the operating member has operated continuously for a predetermined operation reception time period. In the case of this embodiment, when the user carries out a long press operation of continuously pressing the push button 4b for a predetermined time period (for example, 2 seconds, hereinafter referred to as "operation reception time period"), the manual reception is carried out. Continuous operation is required for the user so as to prevent unintended operation due to an operation error. The continuous operation detection operation is carried out by the controller 13 by detecting that the push button 4b has been pressed, and then detecting that the pressing has been continued for a predetermined time period. Further, the continuous operation detection operation is an operation for accepting the reception instruction of the satellite radio wave by the user. In this embodiment, the controller 13 waits for the completion of this continuous operation detection operation, and then detects that the reception instruction is issued. That is, the reception instruction is detected at a timing at which the state of pressing the push button 4b is continued for the above-mentioned operation reception time period.

(2) Activation Operation

An activation operation is an operation of turning on the switch 21 to supply power to the satellite radio wave reception unit 14 for activation thereof. This operation includes initialization of the high frequency circuit 11 and the decoder circuit 12 or the like, and takes a little time. The time point for ending the activation operation may be a time point at which a predetermined time period (for example, 0.6 seconds) has elapsed from the turning on of the switch 21 by the controller 13, or a time point at which the controller 13 has received a signal representing an activation end from the high frequency circuit 11 and the decoder circuit 12. A time period required for the activation operation is hereinafter referred to as "activation time period".

(3) Acquisition and Tracking Operation

An acquisition and tracking operation is an operation of acquiring and tracking a certain satellite radio wave by the satellite radio wave reception unit 14. The term "acquisition" herein refers to an operation of extracting one of the signals multiplexed by CDMA, specifically, an operation of multiplying a received signal by a C/A code corresponding to one signal to extract a correlated signal. When a correlated signal cannot be obtained by the selected C/A code, a different C/A code is selected again to repeat the operation. At this time, when there are a plurality of correlated signals, a signal having the highest correlation may be selected. Further, satellite position information may be used to predict the satellite radio waves that may be received, to thereby limit the number of C/A codes to be selected and reduce the time required for the acquisition operation. Further, the term "tracking" herein refers to an operation of continuously extracting data by matching the phase of the carrier wave of the received signal and the phase of the C/A code contained in the received signal with the phase of the carrier wave of the selected C/A code and the phase of the code for decoding. Note that, it can be said from the meaning of the term "tracking" that the "tracking" is carried out while data is extracted from the satellite radio wave, but the "acquisition and tracking operation" herein refers to an operation from the start of acquiring the satellite radio wave to the head of TLM. This acquisition and tracking operation at least requires a time period of approximately 2 seconds, and the reception success probability increases by spending a longer time although there is an upper limit. On the other hand, when a long time is spent on the acquisition and tracking operation, the time required for the entire reception operation increases to further increase the power consumption. The time period required for the acquisition and tracking operation is hereinafter referred to as "acquisition and tracking time period".

(4) Time Information Acquisition Operation

A time information acquisition operation is an operation of acquiring time information from the satellite radio wave received by the satellite radio wave reception unit 14. In this embodiment, an operation of receiving TLM and HOW and acquiring TOW contained in HOW corresponds to the time information acquisition operation. This operation requires a time period for transmitting TLM and HOW, that is, 60 bits×20 ms=1.2 seconds. Note that, when the reception of the parity at the end of HOW is omitted, 47 bits×20 ms=0.94 seconds are required in the shortest.

(5) Date Information Acquisition Operation

A date information acquisition operation is an operation of acquiring date information that is information relating to the date from the satellite radio wave received by the satellite radio wave reception unit 14. The date information herein refers to information other than time information (that is, hour, minute, and second) and is information for specifying the date on a calendar. In the case of the GPS, WN corresponds to the date information. In this embodiment, an operation of receiving WN transmitted after TLM and HOW to acquire WN corresponds to the date information acquisition operation. Note that, TOW contained in HOW can be simultaneously acquired at this time. Therefore, in this embodiment, the date information acquisition operation also serves as the time information acquisition operation.

(6) Time Information Transfer Operation

A time information transfer operation is an operation of transferring the acquired time information from the satellite radio wave reception unit 14 to the clock circuit 15. As described above, the operation frequency of the satellite radio wave reception unit 14 differs from the operation frequency of the controller 13, and hence the decoded information cannot be directly transferred from the satellite radio wave reception unit 14 to the clock circuit 15. Therefore, the controller 13 once stores the decoded information, and extracts only the necessary time information or time and date information to transfer the information to the clock circuit 15 at an appropriate timing.

(7) Reception Indication Operation

A reception indication operation is an operation of indicating that the reception operation is in progress by the reception indication member 7. In the case of this embodiment, the reception indication operation includes two kinds of indications described later, specifically, indication representing that a first reception operation is in progress ("QRX") and indication representing that another reception operation is in progress ("RX").

(8) Reception Result Indication Operation

A reception result indication operation is an operation of indicating the reception result by the reception indication member 7. The reception result as used herein refers to any one of a case where the reception has succeeded and the internal time is adjusted (corresponding to "OK" indication) and a case where the reception has failed and the internal time is not adjusted (corresponding to "NG" indication).

(9) Previous Reception Result Indication Operation

A previous reception result indication operation is an operation of indicating the previous reception result by the reception indication member 7. The previous reception result as used herein refers to anyone of a case where the previous reception has succeeded and the internal time has been adjusted (corresponding to "OK" indication) and a case where the previous reception has failed and the internal time has not been adjusted (corresponding to "NG" indication).

The controller 13 executes the above-mentioned respective operations while controlling the timings of the respective operations depending on the conditions when the reception instruction is detected.

Incidentally, as described above, a time information receivable time point that is a timing at which TOW is receivable (in the case of this embodiment, a timing at the time point of starting transmission of the subframe, at which TLM and HOW are received in the time information acquisition operation) arrives every 6 seconds. In order to execute the time information acquisition operation to acquire the time information, the activation operation and the acquisition and tracking operation are required to be executed before this time information receivable time point, but the activation time period required for the activation operation is determined based on the hardware characteristics, which cannot be generally controlled. In contrast, the acquisition and tracking time period that is a time period required for the acquisition and tracking operation is variable although there is a minimum required time period. Further, when the acquisition and tracking time period is set long, as described above, the reception success probability increases, but this also has a limit. Spending a long time unnecessarily has less contribution to increase of the reception success probability, and only causes increase in the power consumption.

In view of this, the controller 13 controls an activation time point, which is the timing of starting the activation operation, and the acquisition and tracking time period depending on a time period from a time point at which the reception instruction is detected to an earliest time information receivable time point predicted based on the internal time (which is hereinafter referred to as "delay time period"). In this manner, the reduction of the operating time of the satellite radio wave reception unit 4 and the decrease of the reception failing possibility are both achieved, and the power consumption is reduced as a whole. Specifically, the controller 13 compares the delay time period with a predetermined first threshold value and a predetermined second threshold value, and selects and executes different reception operations described below depending on the result.

<First Reception Operation>

Figure 5A:
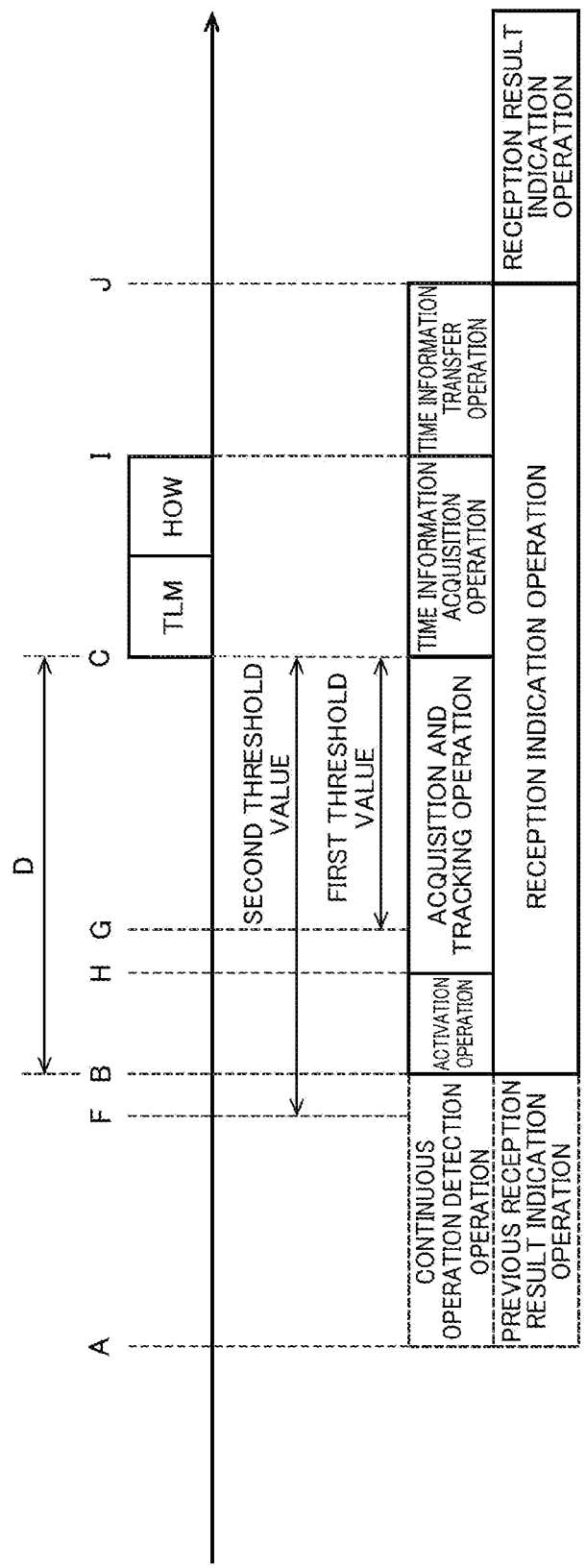
FIG. 5A is a time chart illustrating a first reception operation.

FIG. 5A is a time chart illustrating the first reception operation. In the chart, the horizontal axis represents the elapse of time. The first reception operation is a reception operation executed when the delay time period is longer than the first threshold value and shorter than the second threshold value.

First, prior to the first reception operation, at a time point A at which the push button 4*b* is pressed, the controller 13 starts the continuous operation detection operation so as to detect whether or not the push button 4*b* is continuously operated for the operation reception time period, and simultaneously starts the previous reception result indication operation to cause the reception indication member 7 to indicate the previous reception result. Then, the reception instruction is accepted at a time point B at which the continuous operation detection operation is completed after the push button 4*b* is continuously pressed for the operation reception time period. The controller 13 determines the reception operation to be executed based on the relationship between the time point B at which the reception instruction is accepted and a time information receivable time point C predicted based on the internal time. Note that, the time period from the time point B to the time information receivable time point C corresponds to a delay time period D.

The first reception operation illustrated in FIG. 5A is a reception operation executed when, as a result of comparison of the delay time period D with each of the first threshold value and the second threshold value illustrated in FIG. 5A, the delay time period D is longer than the first threshold value and shorter than the second threshold value. In other words, the first reception operation is executed when the time point B at which the reception instruction is accepted is after a time point F obtained by subtracting the second threshold value from the time information receivable time point C, and prior to a time point G obtained by subtracting the first threshold value from the time information receivable time point C.

When the first reception operation is executed, the controller 13 immediately starts the activation operation at the time point B to supply power to the satellite radio wave reception unit 14, and also starts the reception indication operation to cause the reception indication member 7 to indicate that the reception is in progress. In this case, the first reception operation using a first acquisition and tracking time period is carried out, and hence the secondhand serving as the reception indication member 7 points to "QRX" as the indication representing that the first reception operation is in progress. Further, the controller 13 immediately starts the acquisition and tracking operation at a time point at which the activation operation is ended.

The controller 13 continues the acquisition and tracking operation as it is until the time information receivable time point C, and starts the time information acquisition operation at the time information receivable time point C. As a result, the acquisition and tracking time period changes depending on the timing of the time point B, but the total time period of the acquisition and tracking time period and the activation time period does not fall below the first threshold value or exceed the second threshold value.

After that, the controller 13 acquires TOW contained in HOW, and starts the time information transfer operation at a time point I. Further, the controller 13 starts the reception result indication operation at a time point J at which the time information transfer operation is ended. When the reception has succeeded, the controller 13 causes the reception indication member 7 (in this embodiment, the second hand) to point to the "OK" position indication 5. Note that, the reception result indication operation may start at the time point I without waiting for the transfer of the time information.

This first reception operation is a reception operation placing priority on ending the reception operation in a short period of time. That is, when the minimum acquisition and tracking time period can be secured, the acquisition and tracking time period is varied to attempt the reception of the time information at the earliest time information receivable time point C (that is, the time information receivable time point C that arrives earliest from the current time point).

Note that, the first reception operation may be executed also when the delay time period D cannot be accurately determined, such as when the internal time held in the clock circuit 15 is inaccurate. This is because, in such a case, there is small significance to control the timing of starting the activation operation unlike a second reception operation and a third reception operation described next.

<Second Reception Operation>

FIG. 5B is a time chart illustrating the second reception operation. Also in this chart, the horizontal axis represents the elapse of time.

Similarly to the case of the first reception operation, prior to the second reception operation, the controller 13 starts the continuous operation detection operation and simultaneously the previous reception result indication operation at the time point A at which the push button 4b is pressed. Then, comparison is carried out on the relationship between the time point B at which the reception instruction is accepted and the time information receivable time point C. As illustrated in FIG. 5B, when the delay time period D is longer than the second threshold value, that is, when the time point B at which the reception instruction is accepted is prior to the time point F obtained by subtracting the second threshold value from the time information receivable time point C, the controller 13 executes the second reception operation.

Note that, FIG. 5B illustrates the reception operation of the case of the manual reception, and hence the continuous operation detection operation and the previous reception result indication operation are illustrated. In the case of the automatic reception, however, those two operations are not executed. In the case of the automatic reception, the timing at which the controller determines to carry out the automatic reception corresponds to the time point B.

In the second reception operation, the controller 13 does not execute the activation operation immediately after the time point B at which the reception instruction is accepted, and starts only the reception indication operation at the time point B. At this time, the reception indication member 7 points "RX" as the indication representing that a reception operation other than the first reception operation is in progress. Further, the controller 13 waits for arrival of the activation time point that is inversely calculated from the time information receivable time point C to start the activation operation. In this embodiment, the activation time point is obtained by subtracting the second threshold value from the time information receivable time point C, and matches with the time point F. As a result, the acquisition and tracking time period is fixed, and in this embodiment, has a length obtained by subtracting the activation time period from the second threshold value.

Operations subsequent to the time information receivable time point C are similar to those in the first reception operation described above.

This second reception operation is a reception operation that places priority on the reception success probability and also can avoid wasteful power consumption. That is, as the acquisition and tracking time period, a sufficient time period for achieving high reception success probability can be secured, while the acquisition and tracking time period is not set unnecessarily long.

<Third Reception Operation>

FIG. 6A is a time chart illustrating the third reception operation. Also in this chart, the horizontal axis represents the elapse of time.

Similarly to the cases of the first reception operation and the second reception operation, prior to the third reception operation, the controller 13 starts the continuous operation detection operation and simultaneously the previous reception result indication operation at the time point A at which the push button 4b is pressed. Then, comparison is carried out on the relationship between the time point B at which the reception instruction is accepted and the time information receivable time point C. As illustrated in FIG. 6A, when the delay time period D is shorter than the first threshold value, that is, when the time point B at which the reception instruction is accepted is after the time point G obtained by subtracting the first threshold value from the time information receivable time point C, the controller 13 executes the third reception operation.

In the third reception operation, even when the satellite radio wave reception unit 14 is immediately activated at the time point B at which the reception instruction is accepted, the acquisition and tracking of the satellite radio wave do not end yet at the earliest time information receivable time point C. In view of this, similarly to the case of the second reception operation, the controller 13 does not execute the activation operation immediately after the time point B at which the reception instruction is accepted, and starts only the reception indication operation at the time point B. At this time, the reception indication member 7 points "RX" as the indication representing that a reception operation other than the first reception operation is in progress. Further, the controller 13 waits for arrival of an activation time point F' that is inversely calculated from a next earliest time information receivable time point C' to start the activation operation. When TOW contained in the GPS navigation message is received as the time information as in this embodiment, the next earliest time information receivable time point C' is 6 seconds later the earliest time information receivable time point C.

Operations subsequent to the time information receivable time point C are similar to those in the first reception operation and the second reception operation described above. This third reception operation is also a reception operation that places priority on the reception success probability and also can avoid wasteful power consumption. That is, as the acquisition and tracking time period, a sufficient time period for achieving high reception success probability can be secured, while the acquisition and tracking time period is not set unnecessarily long.

<Fourth Reception Operation>

A fourth reception operation is executed when acquisition of WN is necessary. The acquisition of WN may be executed when the clock circuit 15 stops due to the decrease of a power supply voltage of the satellite radio-controlled wristwatch 1, or when a predetermined period (for example, 1 month) has elapsed from the previous WN reception.

Figure 6B:
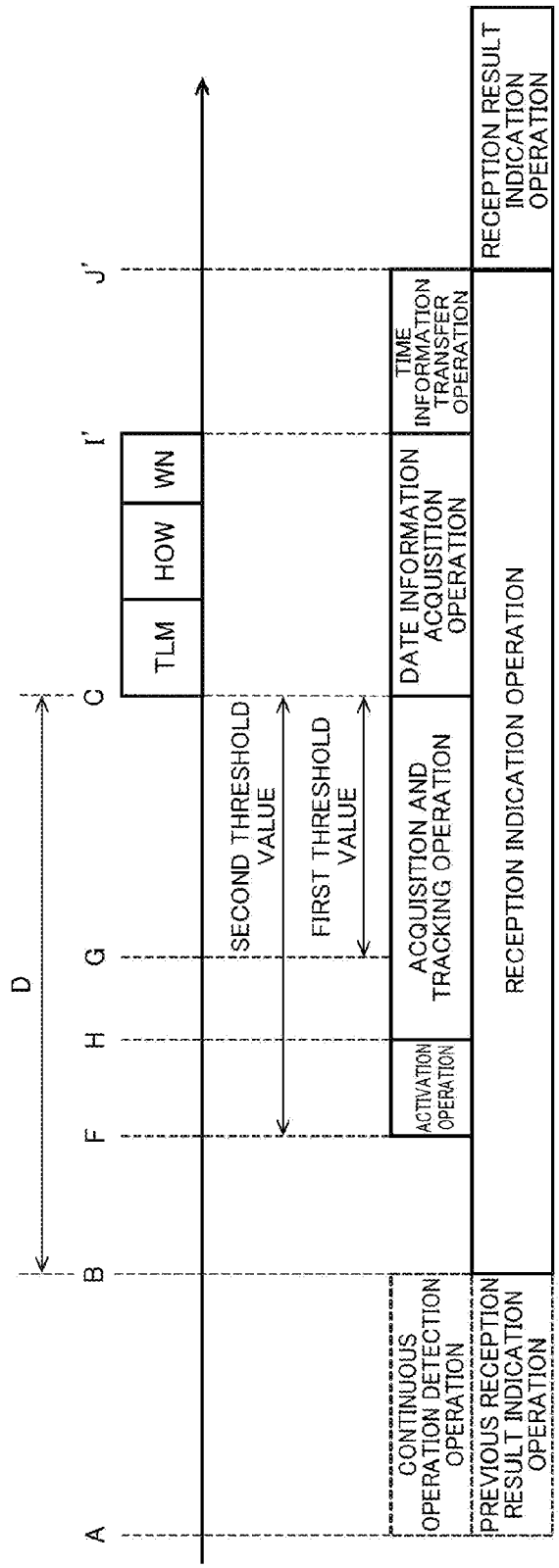
FIG. 6B is a time chart illustrating a fourth reception operation.

FIG. 6B is a time chart illustrating the fourth reception operation. Also in this chart, the horizontal axis represents the elapse of time. The operations in the fourth reception operation are similar to those in the second reception operation described above. The point that, in the case of the automatic reception, the continuous operation detection operation and the previous reception result indication operation illustrated in FIG. 6B are not executed, and the operation starts from the time point B is also the same.

Also in the fourth reception operation, the controller 13 starts only the reception indication operation at the time point B at which the reception instruction is accepted. At this time, the reception indication member 7 points "RX" as the indication representing that a reception operation other than the first reception operation is in progress. Then, the controller 13 waits for arrival of the activation time point that is inversely calculated from the time information receivable time point C to start the activation operation. In this embodiment, the activation time point corresponds to the time point F obtained by subtracting the second threshold value from the time information receivable time point C. As a result, the acquisition and tracking time period is fixed, and in this embodiment, has a length obtained by subtracting the activation time period from the second threshold value. Therefore, the fourth reception operation may be said to be a variation of the second reception operation. Other points are completely the same as the second reception operation until the time information receivable time point C arrives.

The controller 13 starts the date information acquisition operation from the time information receivable time point C to acquire TOW contained in HOW and WN. Note that, as the time information receivable time point C at this time, a time point at which WN can be received, that is, a time point of starting transmission of subframe 1 is selected. After that, the time information transfer operation is started at a time point I' at which the WN acquisition is ended, and a reception result indication operation is carried out at the time point J' at which the transfer of the time information is ended. Note that, similarly to the first reception operation to the third reception operation, the reception result indication operation may be started at the time point I'.

By the way, the time charts of the first to fourth reception operations in FIGS. 5A, 5B, 6A, and 6B illustrate the case where the acquisition of the time information or the date information has succeeded in the time information acquisition operation or the date information acquisition operation. In regard to this point, when the acquisition of the time information or the date information has failed during the time information acquisition operation or the date information acquisition operation, the controller 13 of the satellite radio-controlled wristwatch 1 of this embodiment carries out control to attempt the acquisition again. Several operations are conceivable as a reception operation executed by the controller 13 when the acquisition of the time information has failed (hereinafter this operation is referred to as "re-reception operation"), and any one of those operations may be adopted. FIGS. 7A to 7C are time charts each illustrating the reception operation executed when the acquisition of the time information during the time information acquisition operation has failed in the first reception operation. Note that, similar control is carried out also in the second reception operation to the fourth reception operation, and hence illustration and redundant description of the time charts representing the reception operations executed when the acquisition of the time information or the date information has failed during those reception operations are omitted.

FIG. 7A is a time chart illustrating a first re-reception operation. In the first re-reception operation, because the acquisition of the time information has failed at the time point I at which the first time information acquisition operation is ended, the controller 13 continuously supplies power to the satellite radio wave reception unit 14, and continues the acquisition and tracking operation until next time information receivable time point C'. Then, the second time information acquisition operation is started from the time information receivable time point C'. If the time information is accurately obtained, the time information is transferred through the time information transfer operation started from a time point I' at which the second time information acquisition operation is ended, and after that, at a time point J', the reception result (in this case, the "OK" indication) is indicated by the reception indication member 7 through the reception result indication operation. If the acquisition of the time information is failed even with the second time information acquisition operation, the reception result indication operation is started from the time point I', and the reception result (in this case, the "NG" indication) is indicated by the reception indication member 7. Then, the series of reception operations is ended. This first re-reception operation is continued without losing the result obtained by the first acquisition and tracking operation, and hence the reception success probability is high. On the other hand, the power consumption is large because the satellite radio wave reception unit 14 is operated for a long period of time.

FIG. 7B is a time chart illustrating a second re-reception operation. In the second re-reception operation, after the acquisition of the time information has failed at the time point I at which the first time information acquisition operation is ended, the controller 13 stops the supply of power to the satellite radio wave reception unit 14 to once end the operation of the satellite radio wave reception unit 14. Then, the re-activation operation is started from an activation time point F' inversely calculated from the next time information receivable time point C', in this case, from a time point obtained by subtracting the second threshold value from the next time information receivable time point C', followed by the subsequent acquisition and tracking operation. The second time information acquisition operation is started from the time information receivable time point C'. The subsequent operations are the same as those in the first re-reception operation. In the second re-reception operation, the satellite radio wave reception unit 14 is not operated longer than necessary, and hence the power consumption is smaller than that in the case of the first re-reception operation, but the result obtained by the first acquisition and tracking operation is lost.

FIG. 7C is a time chart illustrating a third re-reception operation. In the third re-reception operation, after the acquisition of the time information has failed at the time point I at which the first time information acquisition operation is ended, the controller 13 continues the supply of power to the satellite radio wave reception unit 14, but stops the operation of the decoder circuit 12 and once ends the operation of the satellite radio wave reception unit 14. Then, the operation of the decoder circuit 12 is restarted from an arbitrary time point H' that is inversely calculated from the next time information receivable time point C', to thereby carry out the acquisition and tracking operation. The second time information acquisition operation is started from the time information receivable time point C'. The operations thereafter are similar to those in the first re-reception operation. This third re-reception operation is an intermediate re-reception operation between the first re-reception operation and the second re-reception operation. The power consumption is more suppressed than that in the first re-reception operation, and the result obtained by the first acquisition and tracking operation is not lost. The acquisition and tracking time period for the second acquisition and tracking operation time may be set to, for example, a length obtained by subtracting the activation time period from the second threshold value, but because the result obtained by the first acquisition and tracking operation can be used, the time period may be shortened. Note that, when the third re-reception operation is adopted, the supply of power from the battery 17 to the high frequency circuit 11 and the decoder circuit 12 is not as illustrated in FIG. 2, and the controller 13 can control whether or not to supply power independently.

FIG. 8 is a flow chart illustrating an operation relating to reception of the satellite radio-controlled wristwatch 1 of this embodiment. This flow chart broadly has the following meaning. Through determination based on the environment in which the satellite radio-controlled wristwatch 1 is placed, when the reception success probability is high and the probability that the re-reception operation is required and the power consumption increases is low, and in addition, when a timing at which the reception instruction is accepted is appropriate, the first reception operation is selected to reduce the reception time period, and otherwise one of the second reception operation to the fourth reception operation is selected to put priority on reception certainty.

The controller 13 first determines whether or not the reception of WN is necessary (Step ST1). When the reception of WN is necessary, the above-mentioned fourth reception operation is selected.

Otherwise, in subsequent Step ST2, the controller 13 carries out determination based on whether the automatic reception or the manual reception is carried out. In this case, when the manual reception is not carried out (=when the automatic reception is carried out), the process proceeds to Step ST8. Note that, from Step ST8, any one of the second reception operation and the third reception operation is selected.

In Step ST3, determination is made based on the position of the hand. In this case, when the hands (such as the hour and minute hands) are located at positions at which the hands affect the reception performance, such as positions overlapping with the antenna 10 in plan view, the process proceeds to Step ST8.

In Step ST4, determination is made based on the power supply voltage. In this case, when the remaining amount of the battery 17 is not equal to or more than a predetermined value, the process proceeds to Step ST8.

In Step ST5, determination is made on whether or not the previous reception has failed. In this case, when the reception by the previous reception operation has failed, the first reception operation is selected. This is because, when the previous reception has failed, the internal time held by the clock circuit 15 is inaccurate, and it is considered that accurate estimation of the delay time period D is impossible. Note that, the previous reception as referred to herein may include all of the reception operations or may mean only the reception through the manual reception.

Further, in Step ST6, determination is made on whether or not the elapsed time period from the time point at which the previous time information is acquired is longer than a third threshold value. Then, when this result is YES, the first reception operation is selected. This third threshold value is set to, for example, 48 hours. This is equal to a condition in which, when the accuracy of the clock circuit 15 is, for example, ±15 seconds per month, an error estimated at maximum is 1 second or more at a time point at which 48 hours have elapsed without adjusting the time. As described above, when the internal time held by the clock circuit 15 has less accuracy due to the error, it is considered that accurate estimation of the delay time period D is still impossible. As a matter of course, the third threshold value may be arbitrarily set depending on the accuracy of the clock circuit 15 or how accurate the delay time period D is estimated.

Then, when the process does not proceed to Step ST8 so far and the first reception operation is not selected, the process proceeds to Step ST7, and determination is made on whether or not the delay time period D is longer than the first threshold value and shorter than the second threshold value. Note that, in FIG. 8, the conditional expression is represented by using non-strict inequality signs, but any one or both of them may be strict inequality signs. When this condition is satisfied, the first reception operation is selected.

Otherwise, the process proceeds to Step ST8, and determination is made on whether or not the delay time period D is shorter than the first threshold value. Note that, also in this case, in FIG. 8, the conditional expression is represented by using a strict inequality sign, but this may be a non-strict inequality sign. When this condition is satisfied, the third reception operation is selected, and otherwise the second reception operation is selected.

Note that, the respective conditions given in Step ST2 to Step ST4 described above are conditions appropriately set so as to roughly determine whether or not the reception success probability is high, and the present invention is not limited thereto. Further, the conditions given in Steps ST5 and ST6 are conditions appropriately set so as to roughly determine the accuracy of the internal time, and the present invention is still not limited thereto. That is, appropriate conditions may be used depending on the assumed specifications and use environment of the satellite radio-controlled wristwatch 1, the user base, or the like. Further, the user may select the conditions by himself/herself.

By the way, in the embodiment described above, the timing at which the reception instruction is accepted is the time point at which the push button 4b has been pressed continuously for the operation reception time period, but the present invention is not necessarily limited thereto. That is, the reception instruction itself may be accepted earlier without waiting for the completion of the continuous operation detection operation. That is, as threshold values of a time period of pressing the push button 4b, a second duration time period equal to the operation reception time period (for example, 2 seconds) and a first duration time period shorter than the second duration time period (for example, 1 second) may be determined. At a time point at which the time period of pressing the push button 4b reaches the first duration time period, the control illustrated in FIG. 8 may be executed assuming that the reception instruction has been issued. In this case, for example, when the first reception operation illustrated in FIG. 5A is selected, the activation operation is started at the time point B at which the reception instruction is issued, and hence the activation operation is started earlier without waiting for the completion of the continuous operation detection operation. With this, the activation operation can be started at an earlier timing, and the time required for the entire reception operation is reduced.

However, at a time point at which the first duration time period has elapsed from the start of pressing the push button 4b, the continuous operation detection operation is not completed, and whether or not the reception instruction is issued by the user is not known yet. Therefore, when the continuous operation detection operation is ended without completion, that is, when the push button 4b is released before elapse of the second duration time period from the start of pressing the push button 4b, the controller 13 stops the supply of power to the satellite radio wave reception unit 14 to end the operation thereof, and cancels the accepted reception instruction. This operation is carried out based on the prediction that, when the push button 4b is continuously pressed for a certain time period, the reception instruction is finally issued in most cases. In this case, the activation operation is started earlier to reduce the time required for the entire reception operation.

Note that, the embodiment described above is merely an example for carrying out the invention, and the present invention is not limited to the specific shapes, arrangement, and configuration described in the embodiment. In particular, the arrangement, numbers, and designs of various members are matters to be appropriately designed by the person skilled in the art as necessary.

The invention claimed is:

1. A satellite radio-controlled wristwatch, comprising:
 a satellite radio wave reception unit comprising an antenna for receiving a satellite radio wave, a high frequency circuit, and a decoder circuit;
 a clock circuit for holding and counting an internal time;
 an operating member for receiving an operation by a user; and
 a controller for controlling timings of at least:
  an activation operation of supplying power to the satellite radio wave reception unit for activation thereof;
  an acquisition and tracking operation of acquiring and tracking a certain satellite radio wave by the satellite radio wave reception unit; and
  a time information acquisition operation of acquiring time information from the satellite radio wave received by the satellite radio wave reception unit,
 the controller being configured to:
  detect a reception instruction by the user through the operation of the operating member;
  immediately start the activation operation when a delay time period is longer than a first threshold value and shorter than a second threshold value, wherein the delay time period is calculated from a time point at which the reception instruction is issued to an earliest time information receivable time point predicted based on the internal time;
  wait for arrival of an activation time point inversely calculated from the earliest time information receivable time point to start the activation operation when the delay time period is longer than the second threshold value; and
  wait for arrival of another activation time point inversely calculated from a next earliest time information receivable time point to start the activation operation when the delay time period is shorter than the first threshold value.

2. The satellite radio-controlled wristwatch according to claim 1, wherein the controller starts the acquisition and tracking operation immediately after the activation operation ends, and waits for arrival of the earliest time information receivable time point to start the time information acquisition operation.

3. The satellite radio-controlled wristwatch according to claim 1, further comprising an indication member for indicating at least that one of a first reception operation is in progress and a second reception operation is in progress,
 wherein the controller is configured to:
  cause the indication member to indicate that the first reception operation is in progress when the delay time period is longer than the first threshold value and shorter than the second threshold value; and
  cause the indication member to indicate that the second reception operation is in progress when the delay time period is longer than the second threshold value or shorter than the first threshold value.

4. The satellite radio-controlled wristwatch according to claim 1, wherein the controller starts the activation operation immediately after the reception instruction is issued when a previous acquisition of the time information has failed.

5. The satellite radio-controlled wristwatch according to claim 1, wherein the controller starts the activation operation immediately after the reception instruction is issued when an elapsed time period, from a time point of a previous acquisition of the time information, is longer than a third threshold value.

6. The satellite radio-controlled wristwatch according to claim 1,
 wherein the operating member comprises a push button, and
 wherein the controller determines that the reception instruction is issued when a time period after pressing the operating member reaches a first duration time period, and the controller cancels the reception instruction to immediately end an operation of the satellite radio wave reception unit when the controller detects another press of the operating member before the time period after pressing the operating member reaches a second duration time period.

7. A method of setting time with a controller comprising:
 detecting, by the controller, a reception instruction by a user through the operation of an operating member;
 immediately starting, by the controller, a first activation operation when a delay time period is longer than a first threshold value and shorter than a second threshold value, wherein the delay time period is calculated from a time point at which the reception instruction is issued to an earliest time information receivable time point predicted based on an internal time held by a clock circuit;

starting a second activation operation, by the controller, at an activation time point that is inversely calculated from the earliest time information receivable time point when the delay time period is longer than the second threshold value;

starting a third activation operation, by the controller, at another activation time point inversely calculated from a next earliest time information receivable time point when the delay time period is shorter than the first threshold value;

receiving, by a satellite radio wave reception unit, a satellite radio wave based upon one of the first, second, or third activation operations, wherein the first, second, and third activation operations comprise supplying power to the satellite radio wave reception unit; and adjusting, by the controller, a time display based on a time information from the received satellite radio wave.

8. The method of claim 7 further comprising:

starting, by the controller, an acquisition and tracking operation immediately after the first activation operations ends, and starting, by the controller, a time information acquisition operation at the earliest time information receivable time point.

9. The method of claim 7 further comprising: starting, by the controller, the first activation operation immediately after the reception instruction is issued when a previous acquisition of the time information has failed.

10. The method of claim 7 further comprising: starting, by the controller, the first activation operation immediately after the reception instruction is issued when an elapsed time period, from a time point of a previous acquisition of the time information, is longer than a third threshold value.

11. The method of claim 7 further comprising:

determining, by the controller, that the reception instruction is issued when a time period after pressing the operating member reaches a first duration time period, and cancelling, by the controller, the reception instruction to immediately end an operation of the satellite radio wave reception unit when detecting another press of the operating member before the time period after pressing the operating member reaches a second duration time period.

* * * * *